Oct. 9, 1928.
F. J. BULLIVANT
1,686,842
ELECTRICAL CONNECTER
Filed Dec. 17, 1924
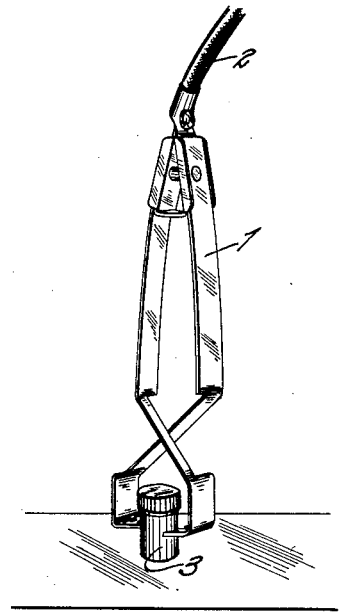
Inventor.
FRANCIS J. BULLIVANT.

Patented Oct. 9, 1928.

1,686,842

UNITED STATES PATENT OFFICE

FRANCIS J. BULLIVANT, OF ST. LOUIS, MISSOURI, ASSIGNOR TO VALLEY ELECTRIC COMPANY, OF ST. LOUIS, MISSOURI, A CORPORATION OF DELAWARE.

ELECTRICAL CONNECTER.

Application filed December 17, 1924. Serial No. 756,598.

This invention pertains to electrical connecters and more particularly to connecters intended for use in places where they are subject to corrosion.

In many cases where it is desired to supply electrical current for a relatively short time temporary connections are made. In such a case it is desirable to provide a connecter or clip by means of which the temporary connection may be quickly and easily made. Such service as for instance the charging of storage batter es often requires such temporary connections. In many classes of such service, as in battery charging service, the presence of chemically active solutions or fumes renders the connecters liable to corrosion. In battery charging service for instance the sulphuric acid used as electrolyte in the battery has a decided tendency to corrode brass and copper connecters.

For such service it is desirable to provide protection for such temporary connecters which will render them immune from corrosion.

One of the objects of this invention, therefore, is to provide an electrical connecter which will be protected against chemical corrosion.

Further objects will appear from the following descr ption taken in connection with the accompanying drawing which illustrates a standard battery connecting clip embodying this invention.

This invention may be applied to a spring clip 1 of any suitable design which may be connected by a conductor 2 w.th a source of current supply and which may make contact with a terminal 3 of a battery or other current receiving device.

The connecter 1 may be of any standard design and in order to protect the same against corrosion may be plated with metallic cadmium. The plating of cadmium may be applied by any suitable process as for instance by electroplating in a su table bath. The coating of cadmium applied may furthermore be of any suitable thickness according to the service required. A thickness of five-ten thousandths of an inch has been found to give good service in practice. It is desirable to coat the entire connecter with a protective coating of cadmium so that every part thereof will be suitably protected.

Connecters plated with cadmium in accordance with this invention have been found by experience to be effectively protected against corrosion by rusting or other chemical action. Such a coat has been found to render effective protection against practically any k nd of a chemically active atmosphere or other corroding influence. In the case of temporary battery connecters it has been found particularly effective.

A cadmium plated connecter is particularly suitable for the reason that cadmium is not only practically immune against corrosion by acids but moreover adheres so firmly to the body metal, such as steel, that it does not peel off nor does the acid creep thereunder. Moreover, the cadmium plat ng does not readily oxidize, even when subjected to circuit breaking acids and therefore, a clean contact surface is maintained. The hardness of cadmium also serves to mainta n contact surfaces and especially surfaces subjected to a biting contact action. The comparatively low resistance of cadmium also renders it especially suitable as a connecter, while its ability to take solder renders it readily attachable to a wire or other conductor.

The application of the protective coating of cadmium is a simple plating operation and one by which the entire connecter can be effectively coated without difficulty. The coating is, therefore, cheap to apply so that it does not mater ally increase the cost of protected connecters.

It is obvious that various changes may be made in the details of construction without departing from the spirit of this invention; it is to be understood, therefore, that this invention is not to be l mited to the specific details shown and described.

Having thus described the invention what is claimed is:

An electrical connecter clip comprising a pair of spring-closed jaws adapted to engage a terminal with a b ting contact and having a closely adhering plating of cadmium covering the same and including the biting contacts so as to preserve their biting action.

In testimony whereof I affix my signature this 2nd day of October, 1924.

FRANCIS J. BULLIVANT.